(12) United States Patent
Pfaff (10) Patent No.: US 9,650,086 B1
(45) Date of Patent: May 16, 2017

(54) DRAG REDUCTION APPARATUS FOR A TRAILER

(71) Applicant: Raimund Pfaff, Omaha, NE (US)

(72) Inventor: Raimund Pfaff, Omaha, NE (US)

( * ) Notice: Subject to any disclaimer, the term of this patent is extended or adjusted under 35 U.S.C. 154(b) by 0 days.

(21) Appl. No.: 15/270,400

(22) Filed: Sep. 20, 2016

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC ....................... B62D 35/001; B62D 35/007
USPC ............................ 296/180.4, 181.5, 180.5
See application file for complete search history.

(56) References Cited

U.S. PATENT DOCUMENTS

| | | | | |
|---|---|---|---|---|
| 4,170,378 A * | 10/1979 | Jacobsen | ............... | B62D 35/002 296/163 |
| 5,332,280 A * | 7/1994 | DuPont | ................ | B62D 35/002 296/180.1 |
| 5,498,059 A * | 3/1996 | Switlik | ................ | B62D 35/001 296/180.1 |
| 6,092,861 A * | 7/2000 | Whelan | ................ | B62D 35/001 296/180.2 |
| 6,309,010 B1 | 10/2001 | Whitten | | |
| 6,799,791 B2 | 10/2004 | Reiman et al. | | |
| 7,380,868 B2 * | 6/2008 | Breidenbach | ........ | B62D 35/001 296/180.1 |
| 7,618,086 B2 * | 11/2009 | Breidenbach | ........ | B62D 35/001 296/180.1 |
| 8,025,329 B1 * | 9/2011 | Kron | ..................... | B62D 35/001 296/180.1 |
| 8,079,634 B2 * | 12/2011 | Visser | .................. | B62D 35/004 296/180.1 |
| 8,672,391 B1 | 3/2014 | Cobb | | |
| 8,820,817 B1 * | 9/2014 | Anderson | ............ | B62D 35/004 296/180.1 |
| 9,039,069 B2 | 5/2015 | Smith et al. | | |
| 9,151,107 B2 | 10/2015 | Kaczmarczyk et al. | | |
| 9,180,919 B2 * | 11/2015 | Breidenbach | ........ | B62D 35/001 |
| 2009/0096250 A1 * | 4/2009 | Kohls | .................. | B62D 35/001 296/180.4 |
| 2010/0181799 A1 * | 7/2010 | Ryan | ..................... | B62D 35/004 296/180.4 |
| 2014/0265437 A1 * | 9/2014 | Smith | .................. | B62D 35/001 296/180.4 |
| 2015/0274220 A1 * | 10/2015 | Telnack | ............... | B62D 35/001 296/180.4 |

* cited by examiner

*Primary Examiner* — Jason S Morrow
*Assistant Examiner* — E Turner Hicks
(74) *Attorney, Agent, or Firm* — Dennis L. Thomte; Thomte Patent Law Office LLC (57) ABSTRACT

A drag reduction apparatus for mounting at the rear of a trailer. The apparatus includes a first unit which is secured to the first door of the trailer and a second unit which is secured to the second door of the trailer. Each of the units includes an upper panel, an intermediate panel and a lower panel. The units are selectively movable between a stowed position and a deployed position.

3 Claims, 6 Drawing Sheets

DRAG REDUCTION APPARATUS FOR A TRAILER

BACKGROUND OF THE INVENTION

Field of the Invention

This invention relates to a drag reduction apparatus for a trailer and more particularly relates to a drag reduction device which is mounted on the rear end of the trailer. Even more particularly, this invention relates to a drag reduction apparatus for a trailer which is easily movable between a stowed position and a deployed position.

Description of the Related Art

Many attempts have been made to provide a drag reduction apparatus for attachment to the rear of a trailer. However, the previous prior art devices have many disadvantages. First, the prior art devices are not durable in use. Second, the prior art devices are not easily attached to the rear of a trailer. Third, the prior art devices are not easily movable between stowed and deployed positions. Fifth, the prior art devices make it difficult to gain access to the interior of the trailer. Lastly, the prior art devices do not satisfactorily reduce the drag on the trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A drag reduction apparatus is disclosed for mounting on the rear end of a trailer. The drag reduction apparatus includes a first drag reduction unit mounted on the left rear door of the trailer and a second drag reduction unit mounted on the right rear door of the trailer. The second drag reduction unit is a mirror image of the first drag reduction unit. The first drag reduction unit includes an upper panel having a first end, a second end, a first side edge, a second side edge, an outer side and an inner side with the first end of the first upper panel being hingedly secured to the left rear door of the trailer adjacent the upper end thereof about a horizontal axis. The first upper panel is selectively hingedly movable between a stowed position and a rearwardly extending deployed position. The first upper panel extends downwardly from the rear door and the first upper panel is in its stowed position. The first drag reduction unit also includes a first intermediate panel having a first end, a second end, a first side edge, a second side edge, a first side and a second side with the first end of the first intermediate panel being hingedly secured to the second end of the first upper panel about a horizontal axis. The first intermediate panel is selectively hingedly movable between a stowed position and a deployed position. The first drag reduction unit also includes a first lower panel having an upper end, a second end, a first side edge, a second side edge, an outer side and an inner side with the first end of the first lower panel being hingedly secured to the second end of the first intermediate panel about a horizontal axis. The first lower panel is selectively hingedly movable between a stowed position and a deployed position. The second end of the first lower panel is hingedly secured to the left rear door of the trailer adjacent the lower end thereof. The first upper panel, the first intermediate panel and the first lower panel have a width which would be substantially equal to the width of the rear door of the trailer. The first drag reduction unit also includes a first locking member having a forward end and a rearward end with the forward end of the first locking member being pivotally secured to the outer side of the left rear door of the trailer. The first locking member is selectively movable between stowed and deployed positions. The first rearward end of the first locking member engages the inner side of the first upper panel, when the first locking member is in its said deployed position, to selectively maintain the first upper panel, the first intermediate panel and the first lower panel of the first drag reduction unit in their deployed positions. A flexible first sheet member closes the outer end of the first drag reduction unit.

The second drag reduction unit includes a second upper panel having a first end, a second end, a first side edge, a second side edge, an outer side and an inner side with the first end of the second upper panel being hingedly secured to the right rear door of the trainer about a horizontal axis. The second upper panel is selectively hingedly movable between a stowed position and a rearwardly extending deployed position. The second upper panel extends downwardly from the right rear door of the trailer when the second upper panel is in its stowed position. The second unit also includes a second intermediate panel having a first end, a second end, a first side edge, a second side edge, a first side and a second side with the first end of the second intermediate panel being hingedly secured to the second end of the second upper panel about a horizontal axis. The second intermediate panel is selectively hingedly movable between a stowed position and a deployed position. The second drag reduction unit also includes a second lower panel having a first end, a second end, a first side edge, a second side edge, an outer side and an inner side with the first end of the second lower panel being hingedly secured to the second end of the second intermediate panel about a horizontal axis. A second lower panel is selectively hingedly movable between a stowed position and a deployed position. The second end of the second lower panel is hingedly secured to the right rear door of the trailer adjacent the lower end thereof about a horizontal axis. The second drag reduction unit also includes a second locking member having a forward end and a rearward end with the forward end of the second locking member being pivotally secured to the outer side of the right rear door of the trailer. The second locking member is selectively movable between stowed and deployed positions. The rearward end of the second locking member engages the inner side of the second lower panel when the second locking member is in its deployed position to selectively maintain the second upper panel, the second intermediate panel and the second lower panel in their deployed positions. A flexible sheet member closes the outer end of the second drag reduction unit.

A drag reduction apparatus is easily moved between a stowed position and its deployed position. In its deployed position, the drag reduction apparatus of this invention reduces the drag on the rear of the trailer.

It is therefore a principal object of the invention to provide an improved drag reduction apparatus for mounting on the rear of a trailer.

A further object of the invention is to provide a device of the type described which is easily moved between a stowed position and a deployed position.

A further object of the invention is to provide a drag reduction apparatus of the type described which is extremely efficient and which is durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional trailer having a forward end 12, a rearward end 14, a first side 16 and a second side 18. The rearward end 14 of trailer 10 is closed by doors 20 and 22 in conventional fashion. For purposes of description, door 20 will be described as having an upper end 24, a lower end 26, an outer end 28, an inner end 30, and an outer side 32. It is to the conventional trailer 10 that Applicant has designed the drag reducing apparatus 34 of this invention to reduce the drag at the rearward end of the trailer. Drag reducing apparatus 34 is comprised of a right unit 34A and a left unit 34B which are attached or mounted on the doors 20 and 22 respectively at the outer side of the doors 20 and 22.

Unit 34A includes an upper panel 36 having a first end 38, a second end 40, a first side edge 42, a second side edge 44, an outer side 46 and an inner side 48. The first end 38 of upper panel 36 is hingedly secured, about a horizontal axis, to door 20 by a hinge 50.

The numeral 52 refers to an intermediate panel having a first end 54, a second end 56, a first side edge 58, a second side edge 60, an inner side 62 and an outer side 64. The first end 54 of intermediate panel 52 is hingedly secured, about a horizontal axis, to the second end 40 of upper panel 36 by a hinge 66.

The numeral 68 refers to a lower panel having a first end 70, a second end 72, a first side edge 74, a second side 76, an outer side 78, and an inner side 80. The first end 70 of lower panel 68 is hingedly secured to the second end 56 of intermediate panel 52 by a hinge 82. The second end 72 of lower panel 68 is hingedly secured, about a horizontal axis, to door 20 adjacent the lower end 26 of door 20 by a hinge 84.

Figure 1:
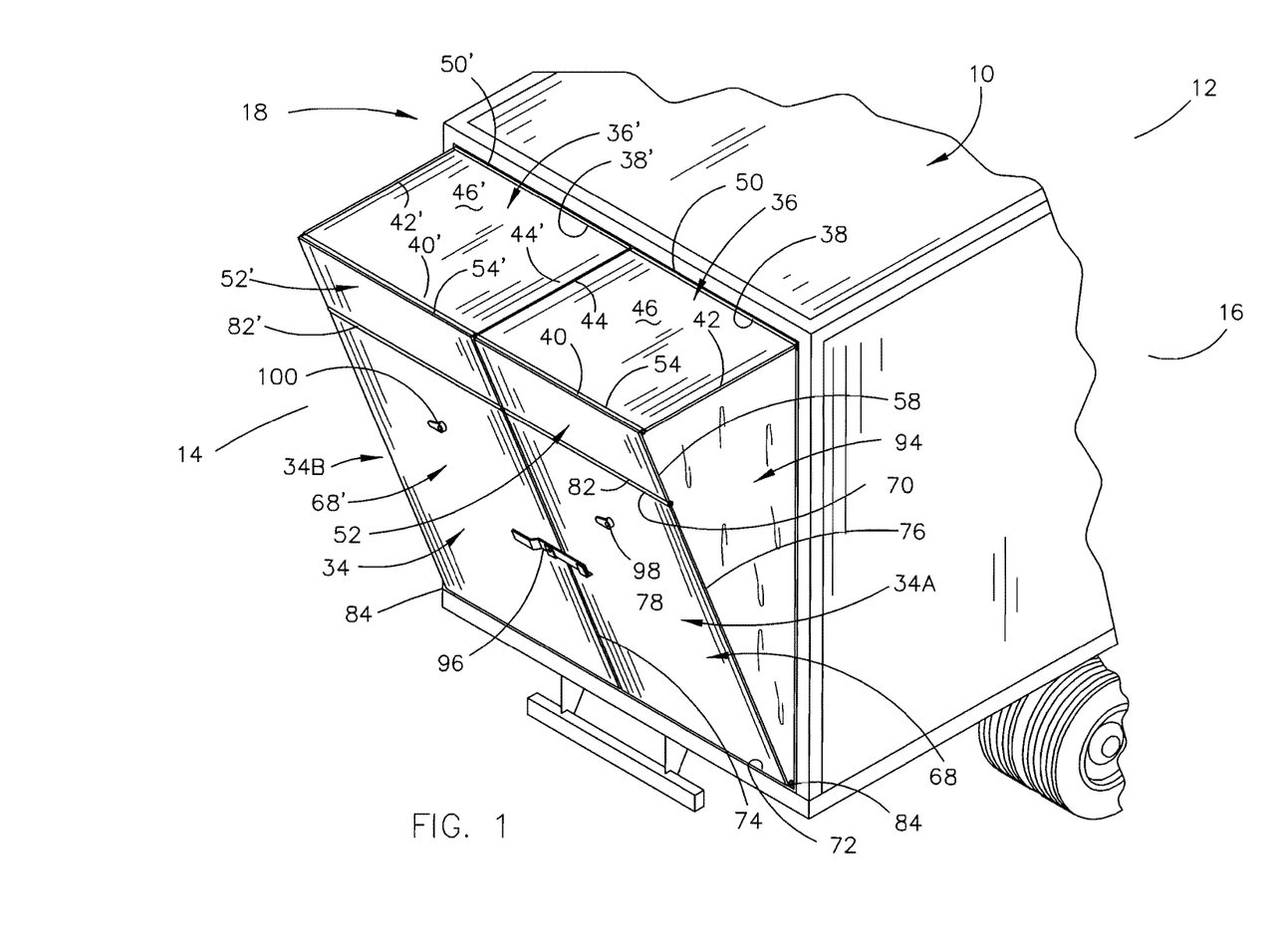
FIG. 1 is a rear perspective view of the drag reduction apparatus of this invention mounted on the rear of a trailer with the drag reduction apparatus of this invention being in its deployed position.
Figure 2:
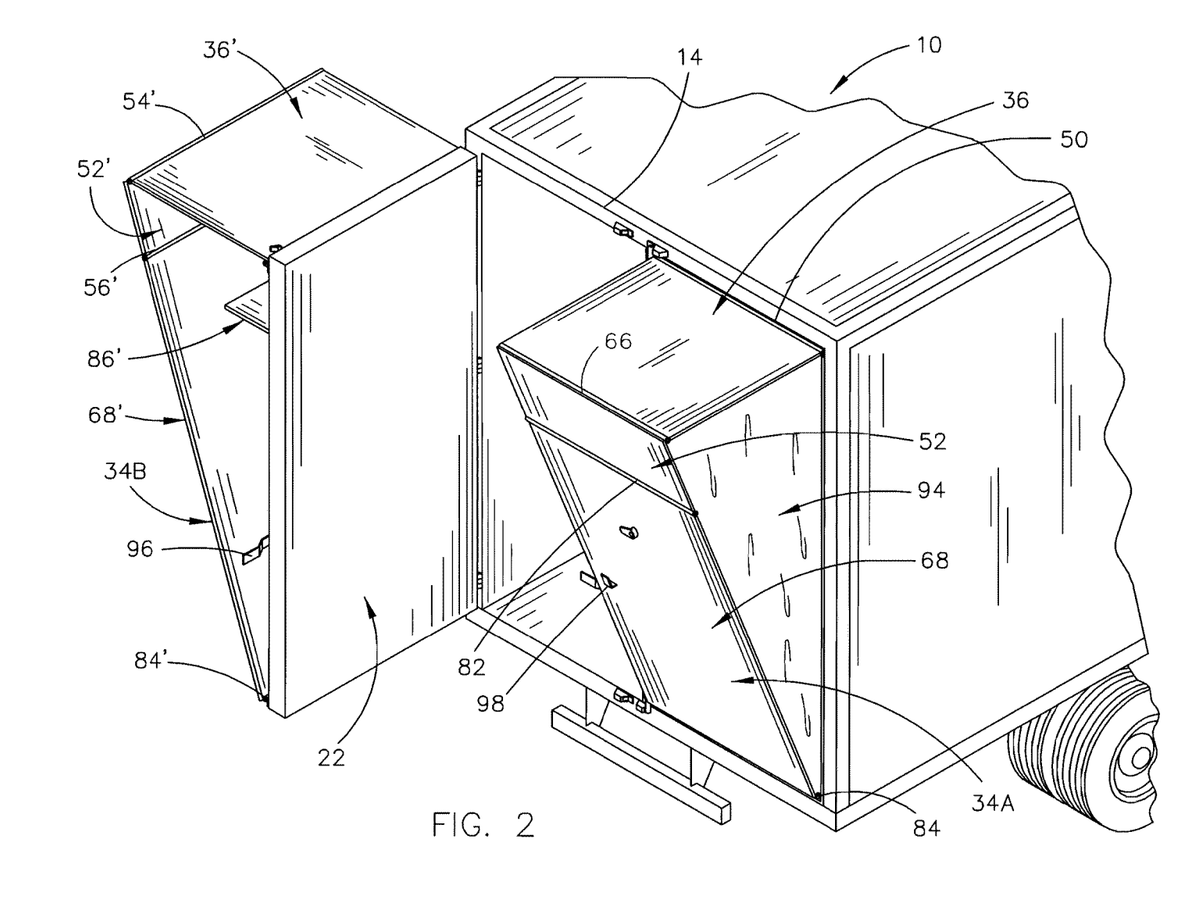
FIG. 2 is a rear perspective and elevational view similar to FIG. 1 except that the left portion of the drag reduction apparatus and the left door have been pivotally moved to its open non-deployed position.
Figure 3:
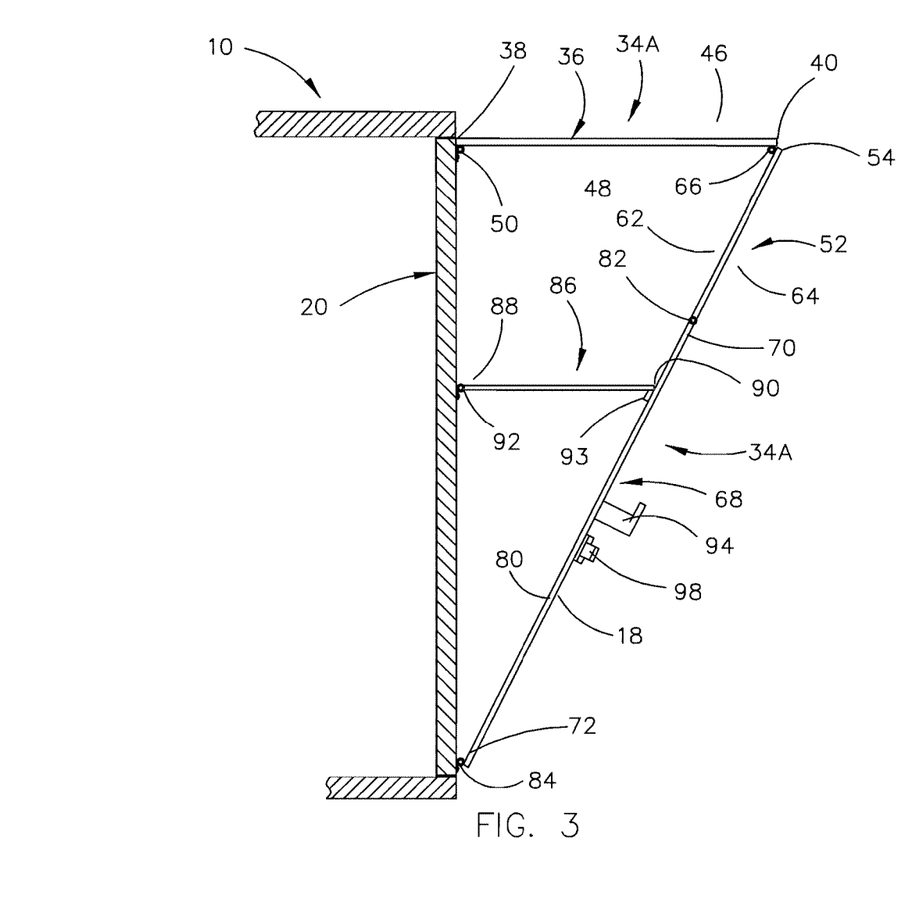
FIG. 3 is an interior side view of the right unit of the drag reduction apparatus of this invention in its deployed position.
Figure 4:
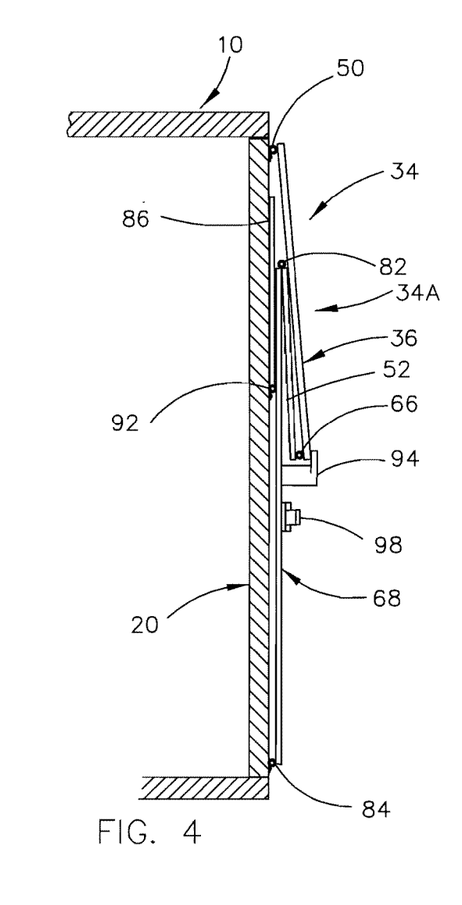
FIG. 4 is an interior side view of the right unit of the drag reduction apparatus of this invention in its stowed position.
Figure 5:
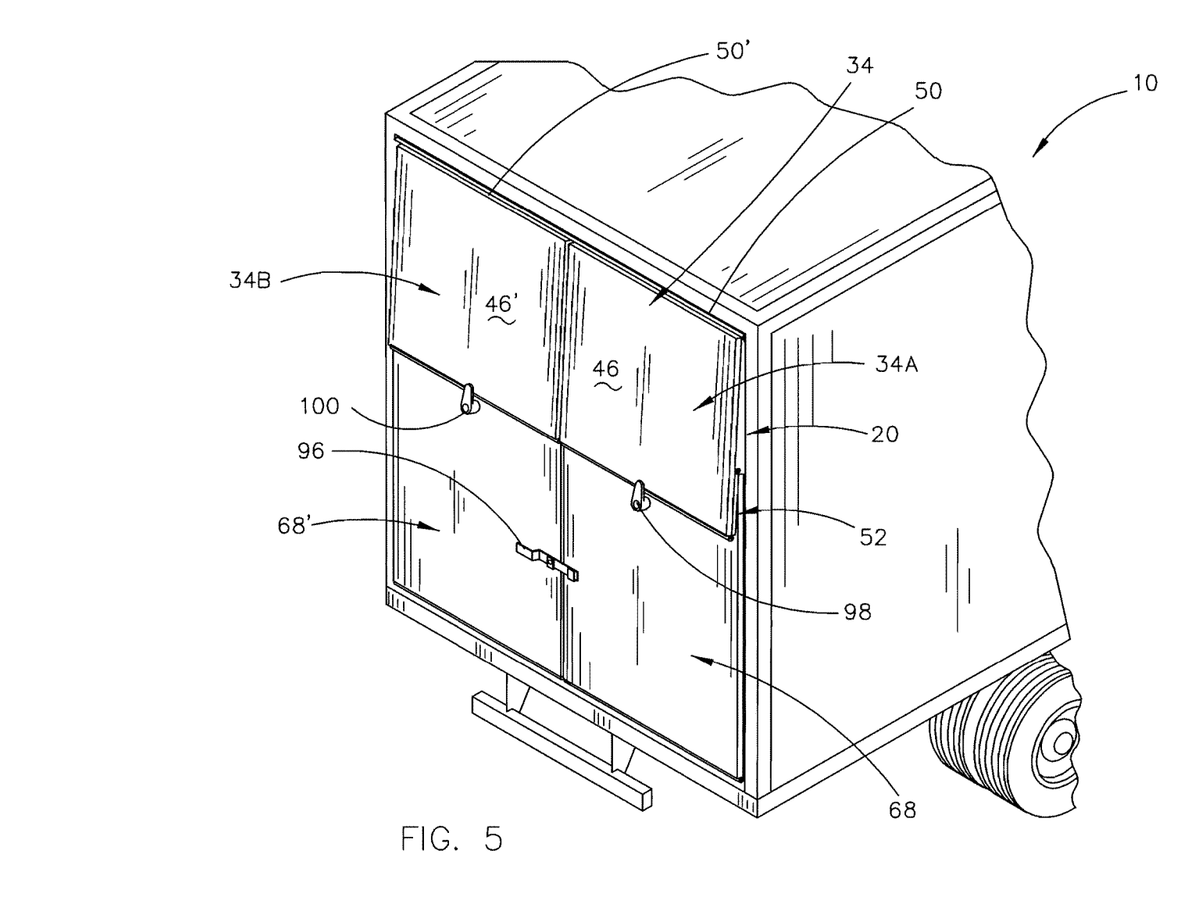
FIG. 5 is a rear perspective view of the drag reduction apparatus of this invention in its folded stowed position.
Figure 6:
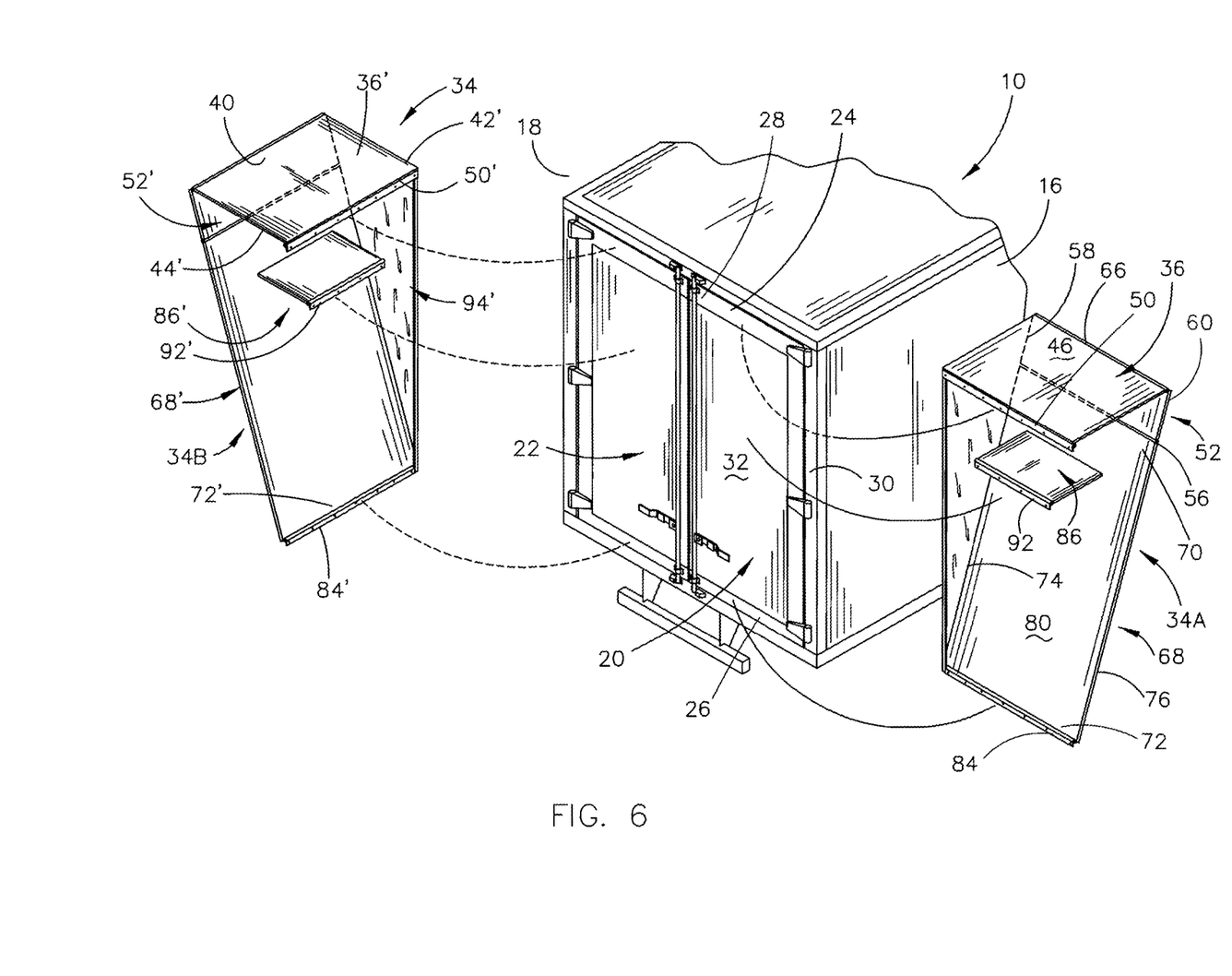
FIG. 6 is a rear exploded perspective view of the drag reduction apparatus of this invention which illustrates the relationship of the apparatus to the trailer doors.
Figure 7:
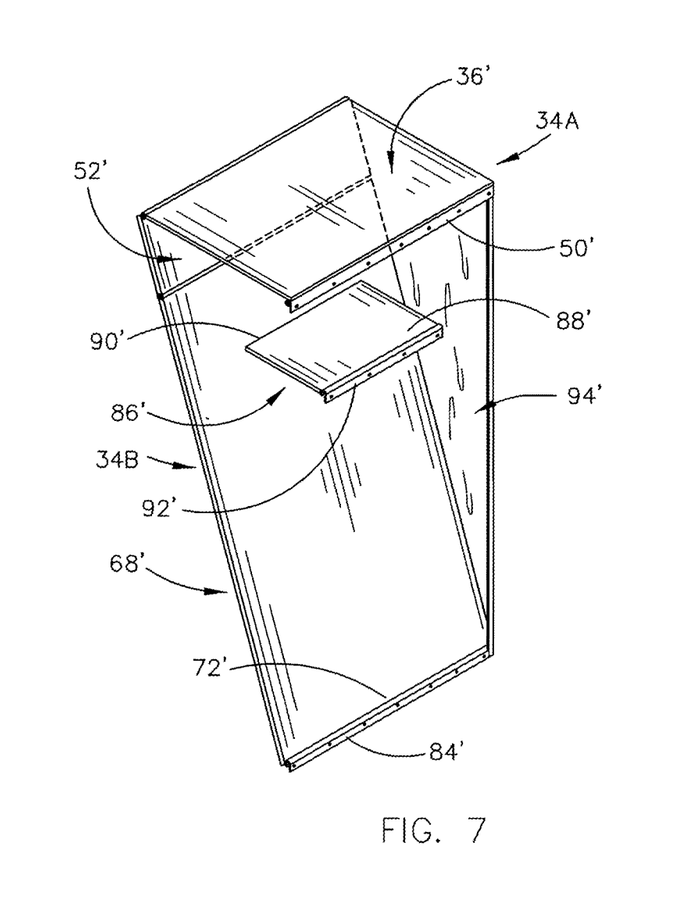
FIG. 7 is a rear perspective view of the left unit of the drag reduction apparatus of this invention in its deployed position.
Figure 8:
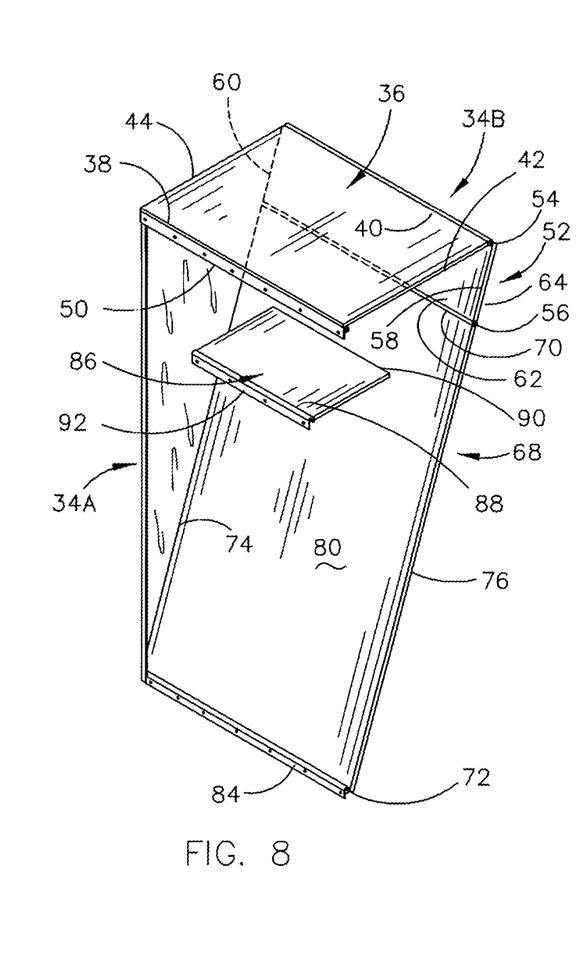
FIG. 8 is a rear perspective view of the right unit of the drag reduction apparatus of this invention in its deployed position.

The numeral 86 refers to a locking device such as a panel of similar structure which has a forward end 88 and a rearward end 90. The forward end 88 of locking device 86 is hingedly secured to the outer side of door 20 by a hinge 92 or other means. The locking device 86 is hingedly movable between a vertically disposed stowed position to a locking position as seen in FIG. 3. The locking device 86 may be manually moved between its stowed position and locking position or by other means. When in its locking position of FIG. 3, the rearward end 90 of locking device 86 engages a stop 93 secured to the inner side of lower panel 68. When in its locking position, locking device 86 maintains the unit 34A in its deployed position.

A flexible sheet member 94 is secured to the outer side of door 20, the first side edge 42 of upper panel 36, the first end edge 58 of intermediate panel 52 and a first side edge 76 of lower panel 68 by any convenient means to close the outer side of unit 34A when unit 34A is in its deployed position.

Unit 34B is a mirror image of unit 34A and will now be described with "'" indicating identical structure on unit 34B. Unit 34B includes an upper panel 36' having a first end 38', a second end 40', a first side edge 42', a second side edge 44', an outer side 46' and an inner side 48'. The first end 38' of upper panel 36' is hingedly secured, about a horizontal axis, to door 20 by a hinge 50'.

The numeral 52' refers to an intermediate panel having a first end 54', a second end 56', a first side edge 58', a second side edge 60', an inner side 62' and an outer side 64'. The first end 54' of intermediate panel 52' is hingedly secured, about a horizontal axis, to the second end 40' of upper panel 36' by a hinge 66'.

The numeral 68' refers to a lower panel having a first end 70', a second end 72', a first side edge 74', a second side 76', an outer side 78', and an inner side 80'. The first end 70' of lower panel 68' is hingedly secured to the second end 56' of intermediate panel 52' by a hinge 82'. The second end 72' of lower panel 68' is hingedly secured, about a horizontal axis, to door 20 adjacent the lower end 26' of door 20 by a hinge 84'.

The numeral 86' refers to a locking device such as a panel of similar structure which has a forward end 88' and a rearward end 90'. The forward end 88' of locking device 86' is hingedly secured to the outer side of door 20 by a hinge 92' or other means. The locking device 86' is hingedly movable between a vertically disposed stowed position to a locking position as seen in FIG. 3. The locking device 86' may be manually moved between its stowed position and locking position or by other means. When in its locking position, locking device 86' maintains the unit 34B in its deployed position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A drag reducing apparatus for a trailer having an open rearward end which is selectively closable by first and second vertically disposed doors with each of the doors having an upper end, a lower end, an outer end, an inner end, an outer side and an inner side, comprising:
   a first upper panel having a first end, a second end, a first side edge, a second side edge, an outer side and an inner side;
   said first end of said first upper panel being hingedly secured to the first door adjacent the upper end thereof about a horizontal axis;
   said first upper panel being selectively hingedly movable between a stowed position and a rearwardly extending deployed position;
   said first upper panel extending downwardly from said first door when said first upper panel is in its said stowed position;
   a first intermediate panel having a first end, a second end, a first side edge, a second side edge, an inner side and an outer side;
   said first end of said first intermediate panel being hingedly secured to said second end of said first upper panel about a horizontal axis;
   said first intermediate panel being selectively hingedly movable between a stowed position and a deployed position;
   a first lower panel having an upper end, a lower end, a first side edge, a second side edge, an outer side and an inner side;
   said upper end of said first lower panel being hingedly secured to said second end of said first intermediate panel about a horizontal axis;
   said lower end of said first lower panel being hingedly secured to the first door adjacent the lower end of the first door about a horizontal axis;
   said first lower panel being selectively hingedly movable between a stowed position and a deployed position;
   said first upper panel, said first intermediate panel and said first lower panel having a width substantially equal to the width of the first door;
   a first locking member having a forward end and a rearward end;
   said forward end of said first locking member being pivotally secured to the outer side of the first door;
   said first locking member being selectively movable between stowed and deployed positions;
   said rearward end of said first locking member engaging said inner side of said first lower panel, when said first locking member is in its said deployed position, to selectively maintain said first upper panel, said first intermediate panel and said first lower panel in their said deployed positions;
   a flexible first sheet member having a front edge with upper and lower ends, an upper edge with first and second ends, and a rear edge having upper and lower ends;
   said front edge of said first sheet member being secured to the first door at the outer end of the first door;
   said upper edge of said first sheet member being secured to said first side edge of said first upper panel;
   said front edge of said first sheet member being secured to said first side edge of said first intermediate panel and said first side edge of said first lower panel;
   a second upper panel having a first end, a second end, a first side edge, a second side edge, an outer side and an inner side;
   said first end of said second upper panel being hingedly secured to the second door adjacent the upper end thereof about a horizontal axis;
   said second upper panel being selectively hingedly movable between a stowed position and a rearwardly extending deployed position;
   said second upper panel extending downwardly from the second door when said second upper panel is in its said stowed position;
   a second intermediate panel having a first end, a second end, a first side edge, a second side edge, an inner side and an outer side;
   said first end of said second intermediate panel being hingedly secured to said second end of said second upper panel about a horizontal axis;
   said second intermediate panel being selectively hingedly movable between a stowed position and a deployed position;
   a second lower panel having an upper end and a lower end, a first side edge, a second side edge, an outer side and an inner side;
   said upper end of said second lower panel being hingedly secured to said second end of said second intermediate panel about a horizontal axis;
   said second lower panel being selectively hingedly movable between a stowed position and a deployed position;
   said lower end of said second lower panel being hingedly secured to the second door adjacent the lower end of the second door about a horizontal axis;
   a second locking member having a forward end and a rearward end;
   said forward end of said second locking member being pivotally secured to the outer side of the second door;
   said second locking member being selectively movable between stowed and deployed positions;
   said rearward end of said second locking member engaging said inner side of said second lower panel, when said second locking member is in its said deployed position, to selectively maintain said second upper panel, said second intermediate panel and said second lower panel in their said deployed positions;
   a flexible second sheet member having a front edge with upper and lower ends, an upper edge with first and second ends, and a rear edge having upper and lower ends;
   said front edge of said second sheet member being secured to the second door at the outer end of the second door;
   said upper edge of said second sheet member being secured to said first side edge of said second upper panel; and
   said rear edge of said second sheet member being secured to said first side edge of said second intermediate panel and said first side edge of said second lower panel.

2. The drag reduction apparatus of claim 1 further including means for maintaining said panels in said stowed positions.

3. A drag reducing apparatus for a trailer having an open rearward end which is selectively closable by first and second vertically disposed doors with each of the doors having an upper end, a lower end, an outer end, an inner end, an outer side and an inner side, comprising:

a horizontally disposed first upper panel having a first end, a second end, a first side edge, a second side edge, an outer side and an inner side;

said first end of said first upper panel being secured to the first door so as to extend rearwardly therefrom at the upper end thereof;

an inclined first panel having upper and lower ends and first and second side edges;

said upper end of said inclined first panel being secured to said second end of said first upper panel whereby said inclined first panel extends downwardly and inwardly from said second end of said first upper panel to the lower end of the first door;

said lower end of said inclined first panel being secured to the first door at the lower end of the first door;

a closure panel secured to said first side edge of said upper panel, the first door and the first side edge of said inclined first panel and extending therebetween;

a horizontally disposed second upper panel having a first end, a second end, a first side edge, a second side edge, an outer side and an inner side;

said first end of said second upper panel being secured to the second door so as to extend rearwardly therefrom at the upper end thereof;

an inclined second panel having upper and lower ends, a first side edge and a second side edge;

said upper end of said inclined second panel being secured to said second end of said second upper panel whereby said inclined second panel extends downwardly and inwardly from said second end of said second upper panel to the lower end of the first door;

said lower end of said inclined panel being secured to the second door at the lower end of the second door;

said first upper panel and second inclined first panel having a width which is equal to the width of the first door;

said inclined first panel having a length which is equal to the height of the first door;

said second upper panel and said inclined second panel having a width which is equal to the width of the first door; and said inclined second panel having a length which is equal to the height of the second door.

\* \* \* \* \*